Patented Jan. 3, 1950

2,492,959

UNITED STATES PATENT OFFICE 2,492,959

DYE PIGMENT

Warren B. Blumenthal, Niagara Falls, N. Y., assignor, by mesne assignments, to National Lead Company, New York, N. Y., a corporation of New Jersey No Drawing. Application March 18, 1947,
Serial No. 735,548

4 Claims. (Cl. 260—429)

The present invention relates to the preparation of pigments from basic dyestuffs and particularly combinations of such dyestuffs with zirconia hydrosols and hydrogels.

Pigments derived from dyes are usually thought of as inorganic materials carrying a dyestuff. However, basic dyes are precipitated from aqueous solution by acids, and pigment products may be prepared for such solutions by the organic acid, tannic acid; the usual precipitants in addition to tannic acid are complex phospho acids such as phosphotungstic acids and phosphomolybdic acid. These three precipitating agents find wide use in the preparation from solutions of basic dyes of pigments of high quality and utility. However, the tannic acid pigments are relatively poor in their quality of fastness to light, while the other pigments are relatively expensive by reason of the high cost of the rarer metals, particularly tungsten.

The present invention provides new and novel pigments of basic dyes and a method of precipitating such dyes from solution.

In accordance with the present invention, color compositions of excellent pigment properties can be prepared at moderate cost by the controlled interaction in aqueous solution of a basic dye with a hydrogel of zirconia in an environment rendering the latter electronegatively charged. Under such conditions, the basic dyestuff combines with the electronegatively charged zirconeate micelles to form a water-insoluble pigment of a large proportion of dye, pigments of high tinctorial strength, soft texture and brilliant hues. The pigments of the present invention are particularly suitable for use in printing inks as they print with an unusually intense and brilliant tone.

The zirconia hydrogel is formed as a water-insoluble hydrous oxide with suitable alkali, such as ammonia or caustic, or as a phosphate with alkaline phosphate, pyrophosphate or metaphosphate and the environment of the solution changed so that the hydrous zirconia hydrogel acquires an electronegative charge. This is effected by adding sufficient of an anion of a particular type, such as tartaric acid, to impart the desired electronegative character to the zirconia hydrogel. In general, the pH of the solution should be in the neighborhood of pH 5 and within the range pH 3.5 to pH 6.5.

In accordance with the principles of the present invention, it has been discovered that when a water-soluble zirconium salt, such as the oxychloride, is precipitated as an hydroxide, hydrated oxide or hydrous oxide, whatever its condition may be, a basic dye will react ionically therewith and when the charge upon the hydrogel of zirconia is changed from positive to negative, will form an insoluble pigment. This condition of the hydrogel can be determined microscopically in a cataphoretic cell provided with oppositely charged plates or electrodes and is apparent when the hydrogel migrates to the positive plate.

The normally positively charged hydrogel of hydrous zirconia is changed to a negatively charged hydrous zirconia in the presence of certain acidic materials. Thus, the precipitated zirconia is present in the hydrous condition, i. e., in combination with an undetermined amount of water molecules as, for instance, $ZrO(OH)_2 \cdot nH_2O$. When an organic acid such as a tartaric acid is added to such solution in an amount insufficient to dissolve the zirconia, the hydrous zirconia is negatively charged due to displacement of a molecule of water according to the following equation where HA represents an acid capable of changing the charge:

(1) 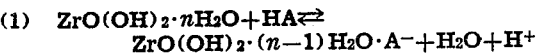
$$ZrO(OH)_2 \cdot nH_2O + HA \rightleftarrows ZrO(OH)_2 \cdot (n-1)H_2O \cdot A^- + H_2O + H^+$$

This change of charge is readily followed by examination in a cell where the phenomenon of cataphoresis will be readily apparent. Whatever the exact mechanism may be, there is a selective combination by the hydrous zirconia with the anions resulting in an ultimate change of charge of the zirconia.

Basic dyes being considered as a positively charged ion of high molecular weight combined with a negative acid ion, the basic dye can be precipitated by reaction with the negatively charged hydrous zirconia obtained as above, with almost instantaneous precipitation of a pigment. This reaction is then as follows:

(2) 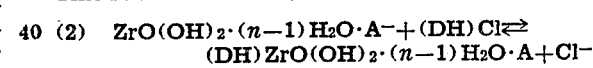
$$ZrO(OH)_2 \cdot (n-1)H_2O \cdot A^- + (DH)Cl \rightleftarrows (DH)ZrO(OH)_2 \cdot (n-1)H_2O \cdot A + Cl^-$$

where (DH)Cl is the hydrochloride of a dye base. The following examples will serve to illustrate how valuable and novel color compositions may be made by my process, but the examples are not to be construed as limiting the process or the product to the specific metallic compounds, dyes, and anions used in these examples.

Example 1

Dissolve 18.17 gm. of $ZrOCl_2 \cdot 8H_2O$ in cold water, then bring to a volume of 90 cc. at 25° C. While stirring vigorously add 25% solution of $NH_4OH$ until a pH of 7.0 has been attained. At this point all of the zirconium has been precipitated. Stir 10 minutes, filter the precipitate and wash with cold water until the wash effluent has only a slight chloride content. The precipitate is $ZrO(OH)_2.2H_2O$ and will be referred to hereafter as "zirconia hydrate."

Disperse the zirconia hydrate pulp in cold water, bringing to a volume of 200 cc. and a temperature of 25° C. While stirring this suspension, run in slowly a solution containing 5.69 gm. Crystal Violet in 100 cc. water at 25° C. Then run in slowly 200 cc. of a solution containing 6.67 gm. citric acid and enough sodium hydroxide to neutralize the solution (pH 7.0). Stir the slurry 10 minutes. The pH should be 5.0 Filter, wash with two 250 cc. portions of cold water. Dry the pulp at 550 C. A strong violet pigment is obtained.

Example II

Dissolve 74.1 gm. of $Na_2HPO_4.12H_2O$ in 2000 cc. water at 25° C. Add 15.0 gm. Methyl Violet dissolved in 300 cc. water, then add slowly 400 cc. of a solution containing 50.0 gm. of $ZrOCl_2.8H_2O$. As the $ZrOCl_2.8H_2O$ solution is running in, add simultaneously a solution of NaOH in a thin, continuous stream at such a rate as to maintain a pH of 7.0 throughout the addition of the $ZrOCl_2.8H_2O$. Then add HCl until a pH of 5.5 is obtained. Stir the slurry 10 minutes, filter it, wash with three 250 cc. portions of cold water and then dry at 55° C. A strong violet pigment is obtained.

Example III

Prepare a dispersion of washed zirconia hydrate as in Example I and bring to a volume of 400 cc. at 25° C. Add slowly thereto 160 cc. of a solution which contains 16.0 gm. salicylic acid and enough sodium hydroxide to dissolve the salicylic acid and yield a pH of 8.0–10.0. Adjust the pH of the slurry to 5.0 with HCl, then add slowly a solution of 11.2 gm. Methyl Violet in 225 cc. water at 25° C. Stir 10 minutes, filter, wash with two 250 cc. portions of cold water and dry at 55° C. A strong violet pigment is obtained, with soft texture and good printing properties.

Example IV

Prepare an aqueous dispersion of washed zirconia hydrate as in Example I and adjust the volume to 400 cc. at 25° C. Pour into the dispersion 32 cc. of an aqueous solution of sodium salicylate containing 16.0 gm. salicylic acid. Adjust the pH of the suspension to 4.5 with HCl, then add slowly a solution of 11.2 gm. Rhodamine B in 225 cc. water. Hold the pH of the reacting mixture at 4.5 with hydrochloric acid while the Rhodamine B is being added. When all is in, lower the pH to 4.0 with HCl. Approximately 99.98% of the dye is precipitated under these conditions. Filter off the precipitate, and wash it with two 250 cc. portions of cold water and dry at 55° C. A strong cerise pigment is obtained of good quality for printing inks.

Example V

Same as Example IV, but use Safranine in place of Rhodamine B. Run in the Safranine as a hot solution (about 75° C.), and make small additions of HCl as the Safranine solution is running in, just sufficient to eliminate the slight dye bleed which will recur if the HCl is not added. When all the Safranine has been added, the pH should be approximately 3.5 and there should be no dye bleed in the slurry. The washed and dried precipitate is a strong, brick red pigment which can be used to prepare a brilliant printing ink of very good fastness to light.

Example VI

Dissolve 18.17 gm. $ZrOCl_2.2H_2O$ in 100 cc. water at 25° C. and while stirring vigorously add $NH_4OH$ until the pH is 3.0. Adjust to a volume of 400 cc. at 25° C. Add slowly 32 cc. of a solution of sodium salicylate containing 16.0 gm. salicylic acid, then add slowly 11.2 gm. Methyl Violet as a 5% aqueous solution. Adjust the pH to 5.0 with HCl and stir 10 minutes. Filter off the precipitate, wash with two 250 cc. portions of cold water and dry at 55° C. A brilliant violet pigment is obtained.

A series of experiments were run to determine the relative amount of the dye precipitated by the hydrous zirconia precipitate, the charge of which had been changed from positive to negative, and the dye content of the solid precipitated phase determined with results set forth in Table I.

Table I

| Dye Used | Anion Used | Dye Content of Precipitated Phase | Proportion of the dye not Precipitated |
|---|---|---|---|
| | | Per cent | Per cent |
| Auramine | salicylate | 43.9 | 0.5 |
| Bismarck Brown | citrate | 36.8 | 0.1 |
| Do | salicylate | 66.8 | 2.5 |
| Crystal Violet | citrate | 39.5 | 0.2 |
| Do | salicylate | 46.4 | 0.00 |
| Methyl Violet | do | 50.0 | 0.2 |
| Methylene Blue | do | 23.0 | 0.6 |
| New Blue | do | 43.3 | 0.3 |
| Rhodamine B | do | 44.4 | 0.02 |
| Safranine | do | 50.0 | 0.02 |
| Victoria Green | do | 37.7 | 0.1 |

From the above table it will be noted that the basic dyes containing tertiary amine type residues are precipitated with somewhat more thoroughness than either secondary amine or primary amine types, Crystal Violet, for instance, being completely precipitated while Bismarck Brown remains unprecipitated to the extent of about 2.5% under the influence of salicylate ion in both instances.

The possibility that an anion will induce a cataphoretic effect upon the hydrous zirconia must be determined empirically in the case of any anion. It has been found that the following anions are effective; salicylate, benzoate, bichromate, citrate, glycollate, lactate, malate, dihydrogen phosphate, tartrate, mucate and others, while no effective action is obtained with chloride, formate, acetate, B-hydroxybutrate, monochloracetate, oxalate, propionate, fluoride and sulfate, and others.

What is claimed is:

1. The method of producing a pigment which comprises reacting a basic dye in an aqueous solution within the pH range pH 3.5 to 6.5 with a hydrous zirconia hydrogel, the usual positive charge of which has been changed to a negative charge by selective combination of an anion which induces cataphoretic movement of the resulting negative micelle to the positive electrode of a cataphoretic cell.

2. The method of producing a pigment which comprises reacting a basic dye in an aqueous solution having a pH in the neighborhood of pH 5 with a hydrous zirconia hydrogel, the usual positive charge of which has been changed to a negative charge by selective combination of an anion which induces cataphoretic movement of the resulting negative micelle to the positive electrode of a cataphoretic cell.

3. The method of producing a pigment which comprises reacting a basic dye in an aqueous solution within the pH range pH 3.5 to 6.5 with a hydrous zirconia hydrogel, the usual positive charge of which has been changed to a negative charge by salicylic acid.

4. The method of producing a pigment which comprises reacting a basic dye in an aqueous solution within the pH range pH 3.5 to 6.5 with a hydrous zirconia hydrogel, the usual positive charge of which has been changed to a negative charge by citric acid.

WARREN B. BLUMENTHAL.

REFERENCES CITED

The following references are of record in the file of this patent:

UNITED STATES PATENTS

| Number | Name | Date |
| --- | --- | --- |
| 558,197 | Muller-Jacobs | Apr. 14, 1896 |
| 1,343,446 | Goodschmidt | June 15, 1920 |
| 2,452,616 | Wainer et al. | Nov. 2, 1948 |
| 2,455,898 | Ness | Dec. 7, 1948 |

OTHER REFERENCES

Bancroft et al.: "J. Phys. Chem.," vol. 34 (1930) pages 1767–1776.